United States Patent
Turner

(10) Patent No.: US 11,533,319 B2
(45) Date of Patent: Dec. 20, 2022

(54) MULTI-MODAL ACCESS POLICY ENFORCEMENT

(71) Applicant: Aaron Turner, Idaho Falls, ID (US)

(72) Inventor: Aaron Turner, Idaho Falls, ID (US)

(73) Assignee: HOTSHOTS TECHNOLOGIES S.À.R.L., Esch-sur-Alzette (LU)

(*) Notice: Subject to any disclaimer, the term of this patent is extended or adjusted under 35 U.S.C. 154(b) by 264 days.

(21) Appl. No.: 17/048,747

(22) PCT Filed: May 1, 2019

(86) PCT No.: PCT/US2019/030274
§ 371 (c)(1),
(2) Date: Oct. 19, 2020

(87) PCT Pub. No.: WO2019/213316
PCT Pub. Date: Nov. 7, 2019

(65) Prior Publication Data
US 2021/0243199 A1 Aug. 5, 2021

Related U.S. Application Data

(60) Provisional application No. 62/665,300, filed on May 1, 2018.

(51) Int. Cl.
*H04L 9/40* (2022.01)
*H04L 9/08* (2006.01)

(52) U.S. Cl.
CPC .......... *H04L 63/107* (2013.01); *H04L 9/0833* (2013.01); *H04L 9/0891* (2013.01); *H04L 63/102* (2013.01)

(58) Field of Classification Search
CPC ... H04L 63/107; H04L 9/0833; H04L 9/0891; H04L 63/102
See application file for complete search history.

(56) References Cited

U.S. PATENT DOCUMENTS

| | | | |
|---|---|---|---|
| 6,370,629 B1* | 4/2002 | Hastings | G06F 21/6218 713/193 |
| 9,680,827 B2* | 6/2017 | Ronca | H04L 63/062 |
| 9,705,813 B2* | 7/2017 | Marshall | H04L 63/104 |
| 9,864,874 B1* | 1/2018 | Shanbhag | H04L 63/10 |
| 10,853,350 B1* | 12/2020 | Sharifi Mehr | G06F 16/2365 |
| 2002/0136407 A1* | 9/2002 | Denning | H04L 63/1408 380/258 |

(Continued)

OTHER PUBLICATIONS

PCT/US2019/030274, "Notification of Transmittal of the International Search Report and the Written Opinion of the International Searching Authority, or the Declaration", dated Jul. 16, 2019, pp. 1-12.

*Primary Examiner* — Catherine Thiaw
(74) *Attorney, Agent, or Firm* — Scott D. Thorpe; Kunzler Bean & Adamson

(57) ABSTRACT

For access policy enforcement, a method restricts access to a decryption key for private data on an electronic device. The private data is encrypted and includes group communications. The method determines an electronic device profile that includes a device time and a device location of the electronic device. The method releases the decryption key in response to the electronic device profile satisfying an access policy. The method decrypts the private data using the decryption key.

14 Claims, 12 Drawing Sheets

(56) References Cited

U.S. PATENT DOCUMENTS

| | | | |
|---|---|---|---|
| 2008/0184334 A1* | 7/2008 | Hebert | G06F 21/6218 |
| | | | 726/1 |
| 2009/0100268 A1 | 4/2009 | Garcia et al. | |
| 2010/0266132 A1 | 10/2010 | Bablani et al. | |
| 2011/0191859 A1 | 8/2011 | Naslund et al. | |
| 2011/0225417 A1 | 9/2011 | Maharajh et al. | |
| 2013/0159704 A1* | 6/2013 | Chandrasekaran | ............................ |
| | | | H04L 63/0823 |
| | | | 713/155 |
| 2014/0033271 A1* | 1/2014 | Barton | H04W 12/64 |
| | | | 726/1 |
| 2014/0075493 A1* | 3/2014 | Krishnan | H04L 67/52 |
| | | | 726/1 |
| 2014/0082348 A1 | 3/2014 | Chandrasekaran et al. | |
| 2016/0357959 A1 | 12/2016 | Dabbiere et al. | |
| 2018/0248863 A1* | 8/2018 | Kao | H04L 63/102 |
| 2019/0013942 A1* | 1/2019 | Brown | H04L 9/3226 |

* cited by examiner

301

Time Restrictions for Night Shift

| Active Allowed Times (323) | Add Allowed Time (325) | Allowed Time Zone (327) |

All allowed times for this user group will be set to this time zone:

321

(UTC) Coordinated Universal Time

- (UTC-12:00) International Date Line West
- (UTC-11:00) Coordinated Universal Time-11
- (UTC-10:00) Aleutian Islands
- (UTC-10:00) Hawaii
- (UTC-09:30) Marquesas Islands
- (UTC-09:00) Alaska
- (UTC-09:00) Coordinated Universal Time-09
- (UTC-08:00) Baja California
- (UTC-08:00) Coordinated Universal Time-08
- (UTC-08:00) Pacific Time (US & Canada)
- (UTC-07:00) Arizona
- (UTC-07:00) Chihuahua, La Paz, Mazatlan
- (UTC-07:00) Mountain Time (US & Canada)
- (UTC-06:00) Central America
- (UTC-06:00) Central Time (US & Canada)
- (UTC-06:00) Easter Island

FIG. 3D

MULTI-MODAL ACCESS POLICY ENFORCEMENT

This applications claims priority to U.S. Provisional Patent Application No. 62/665,300 entitled "MULTI-MODAL ENCRYPTION POLICY ENFORCEMENT" and filed on May 1, 2018 for Aaron Turner, which is incorporated herein by reference.

FIELD

The subject matter disclosed herein relates to multi-modal access policy enforcement.

BACKGROUND

Private data should only be accessible for authorized uses.

BRIEF SUMMARY

A method for access policy enforcement is disclosed. The method restricts, by use of a processor, access to a decryption key for private data on an electronic device. The private data is encrypted and comprises group communications. The method determines an electronic device profile comprising a device time and a device location of the electronic device. The method releases the decryption key in response to the electronic device profile satisfying an access policy. The method decrypts the private data using the decryption key. An apparatus and computer program product also perform the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3D is a drawing illustrating one embodiment of a time restriction screen;

DETAILED DESCRIPTION

Figure 1A:
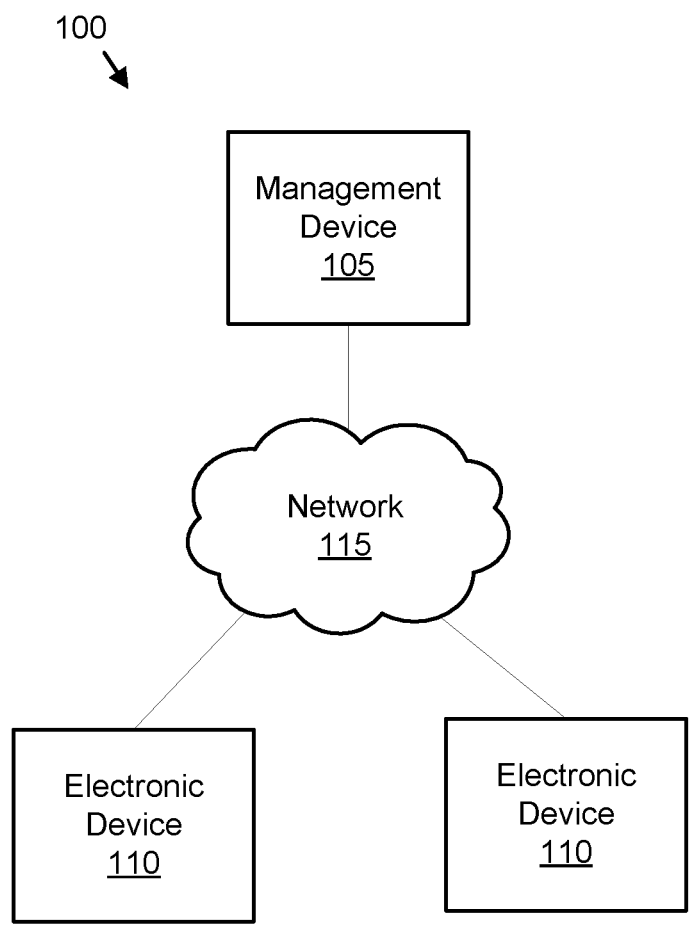
FIG. 1A is a schematic block diagram illustrating one embodiment of a private data encryption system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Private data should only be accessible for approved uses. The embodiments only release decryption keys when an access policy is satisfied.

FIG. 1A is a schematic block diagram illustrating one embodiment of a private data encryption system 100. In the depicted embodiment, the system 100 includes a management device 105, one or more electronic devices 110, and a network 115. The electronic devices 110 may be mobile telephones, tablet computers, laptop computers, and the like.

The network 115 may be the Internet, a mobile telephone network, a wide-area network, a local area network, a Wi-Fi network, or combinations thereof. The management device 105 may manage communication between the electronic devices.

The electronic devices 110 may be organized in a user group. The electronic devices 110 may share private data through the network 115. In one embodiment, the electronic devices 110 in the user group share the private data. The private data may include group communications such as voice communications, text communications, email communications, shared data files, and the like. The private data 115 is encrypted. As a result, the communications and shared data files are private to the user group.

In the past, electronic devices 110 in a user group have been able to access the private data without restriction after joining the user group. For example, if a first user joins the user group with an electronic device 110 such as a mobile telephone, the first user is then able to access the private data of the group regardless of the disposition of the mobile device 110. As a result, the electronic device 110 is able to access the private data in situations where the private data should not be accessed such as outside of secure locations and/or outside of authorize time periods.

The embodiments disclosed herein restrict access to a decryption key for the private data on the electronic device 110. The decryption key is only released when an electronic device profile for the electronic device 110 satisfies an access policy. Therefore, the encrypted private data is only accessed on the electronic device 110 if the access policy is satisfied. The electronic device profile may include a device time and/or a device location of the electronic device. Thus the access policy may be satisfied and the decryption key released only if the device time is within a time range of the access policy and/or the device location is within a geographic area of the access policy.

The embodiments prevent the encrypted private data from being accessed by the electronic device 110 when the electronic device 110 is outside of the geographic area and/or when the device time is not within the time range. The embodiments allow the security of the private data to be managed more effectively. For example, if the electronic device 110 is taken by an unauthorized user and used outside of the geographic area, the private data is still inaccessible even if the unauthorized user gains access to the electronic device 110. In another example, if the electronic device 110 is temporarily accessed by the unauthorized user outside of the time range, the private data remain secure. As a result, the security of the private data is greatly enhanced.

Figure 1B:
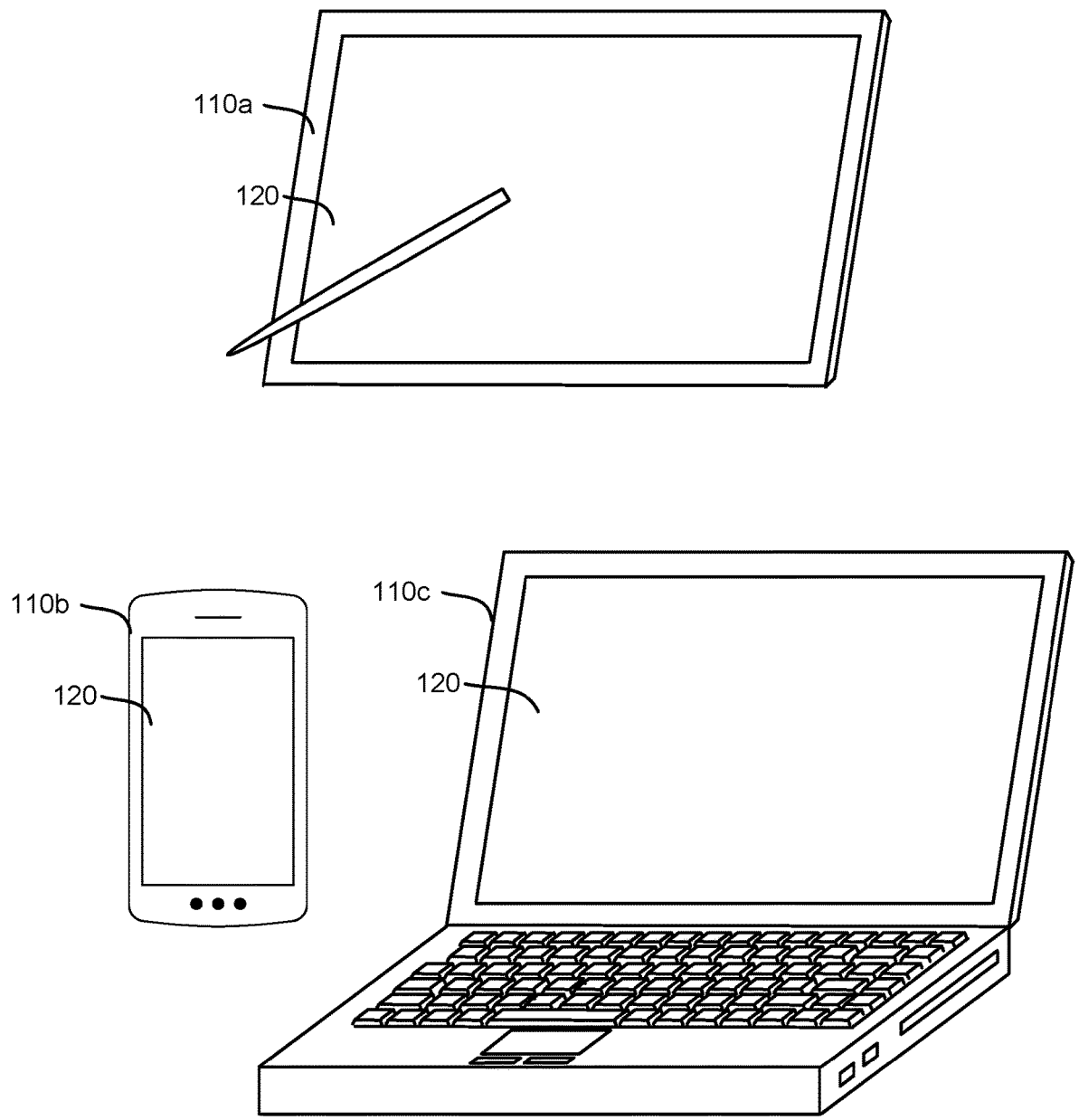
FIG. 1B is drawings of embodiments of electronic devices.

FIG. 1B is drawings of embodiments of the electronic devices 110. In the depicted embodiment, a tablet electronic device 110a, a mobile telephone electronic device 110b, and a laptop computer electronic device 110c are shown. Each electronic device 110 includes a display 120.

Figure 2A:
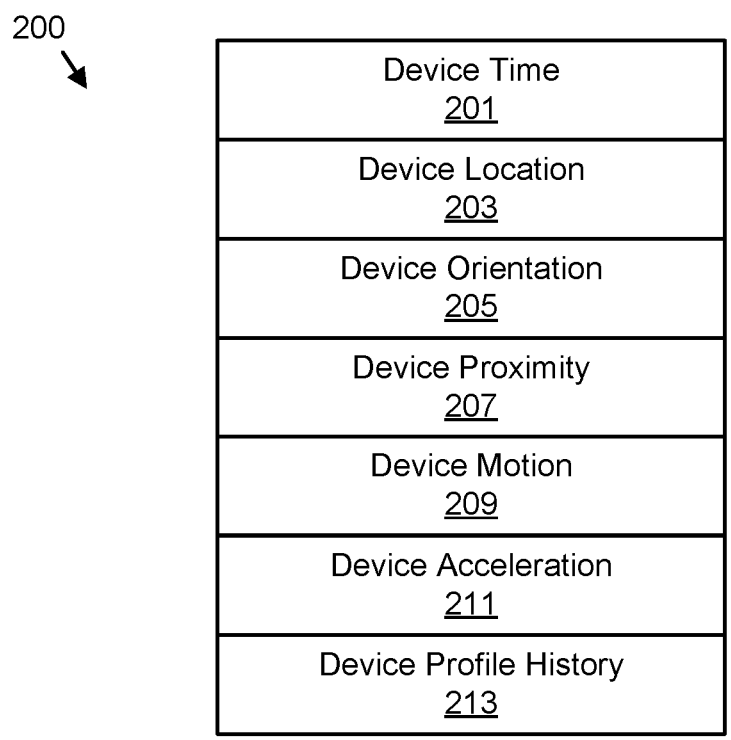
FIG. 2A is a schematic block diagram illustrating one embodiment of an electronic device profile.

FIG. 2A is a schematic block diagram illustrating one embodiment of the electronic device profile 200. The electronic device profile 200 may be organized as a data structure in a memory. In the depicted embodiment, the electronic device profile 200 includes the device time 201, the device location 203, a device orientation 205, a device proximity 207, a device motion 209, a device acceleration 211, and a device profile history 213.

The device time 201 may record a current time of the electronic device 110. The device time 201 may be recorded from an internal clock of the electronic device 110. Alternatively, the device time 201 may be accessed through the network 115 such as from the management device 105.

The device location 203 may record a current location of the electronic device 110. In one embodiment, the device location 203 is recorded from global positioning system (GPS) coordinates generated by the electronic device 110. In addition, the device location 203 may include a network identifier from a Wi-Fi network, wide-area network, local area network, and the like. The device location 203 may also include base station information from a mobile telephone network.

The device orientation 205 may specify the three-dimensional orientation of the electronic device 110 relative to a vertical axis. The device orientation 205 may be recorded from an accelerometer of the electronic device 110.

The device proximity 207 may record the proximity of the electronic device 110 to a user. In one embodiment, the device proximity 207 is recorded from a display 120 of the electronic device 110. The display 120 may be an electrostatic display and may sense proximity to the screen. In one embodiment, the device proximity 207 records the proximity of an object such as a face or hand to the display 120 of the electronic device 110.

The device motion 209 may record a motion vector of the electronic device 110. In one embodiment, the motion vector is calculated from the plurality of GPS coordinates and corresponding device times 201. In addition, the motion vector may be calculated based on a plurality of device accelerations 211 and corresponding device times 201.

The device acceleration 211 may record the acceleration of the electronic device 110. The device acceleration 211 may be recorded from the accelerometer of the electronic device 110.

The device profile history 213 may record a plurality of electronic device profiles 200. In one embodiment, the device profile history 213 includes electronic device profiles selected at a sampling interval such as each five minutes and/or each 30 seconds.

Figure 2B:
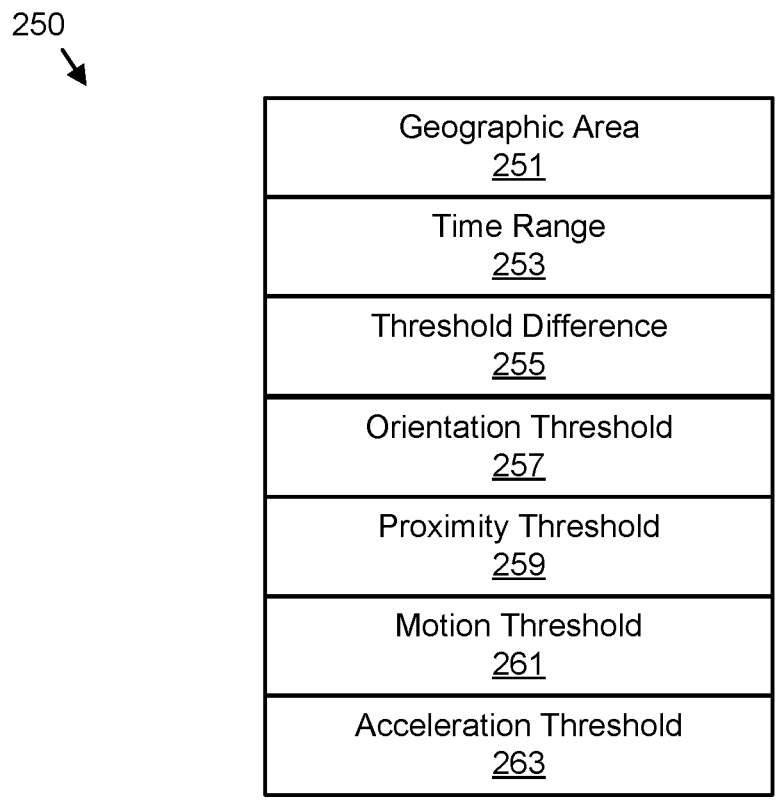
FIG. 2B is a schematic block diagram illustrating one embodiment of an access policy.

FIG. 2B is a schematic block diagram illustrating one embodiment of the access policy 250. The access policy 250 maybe organized as a data structure in a memory. In the depicted embodiment, the access policy 250 includes the geographic area 251, the time range 253, a threshold difference 255, an orientation threshold 257, a proximity threshold 259, a motion threshold 261, and an acceleration threshold 263. In one embodiment, one or more of the geographic area 251, time range 253, threshold distance 255, orientation threshold 257, proximity threshold 259, motion threshold 261, and acceleration threshold 263 must be satisfied to satisfy the access policy 250.

The geographic area 251 may specify one or more areas where the private data may be accessed. In one embodiment, the geographic area 251 is specified for two-dimensional areas relative to the surface of the earth. The geographic area 251 may not be satisfied if a coordinate comprising a longitude and latitude is outside of the geographic area 251.

In addition, the geographic area 251 may be specified for three-dimensional areas relative to the surface of the earth. For example, the geographic area 251 may not be satisfied if a coordinate comprising the longitude, the latitude, and an altitude is outside of the geographic area 251.

In one embodiment, the geographic area 251 is specified as a center point and a radius from the point, wherein all coordinates less than the radius from the center point are within the geographic area 251. In one embodiment, the center point is a street address. In a certain embodiment, the coordinates are projected onto the surface of the earth.

In one embodiment, the geographic area 251 is specified as a region within a set of closed lines and/or curves. The geographic area 251 may further specify a maximum altitude within the region.

In a certain embodiment, the geographic area 251 is specified as a political boundary, such as within a national border, a state or provincial border, a city border, or the like. The geographic area 251 may be satisfied if the device location 203 is within the geographic area 251.

The time range 253 may comprise one or more time intervals. Each time interval may have a start day, date, and/or time and an end day, date, and/or time. In addition, the time range 253 may include a time zone. The time range 253 may be satisfied if the device time 201 is within one or more of the time intervals.

The threshold difference 255 may be satisfied if a weighted difference between elements of the electronic device profile 200 and one or more instances of the device profile history 213 are within the threshold difference 255.

The orientation threshold 257 may be satisfied if the device orientation 205 is within ranges for a roll, pitch, and yaw for the electronic device 110. The proximity threshold 259 may be satisfied if the device proximity 207 is less than the proximity threshold 259. The proximity threshold 259 may be in the range of 0 to 15 centimeters (cm).

The motion threshold 261 may be satisfied if the device motion 209 is less than the motion threshold 261. In a certain embodiment, the motion threshold 261 is in the range of 2 to 3 meters/second (m/s). The acceleration threshold 263 may be satisfied if the device acceleration 211 is less than the acceleration threshold 263 for an acceleration time interval. The acceleration threshold 263 may be in the range of 8 to 9 m/s².

Figure 2C:
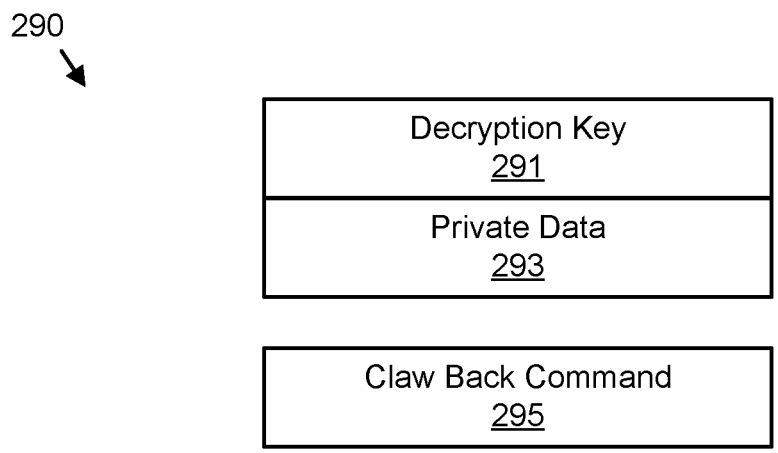
FIG. 2C is a schematic block diagram illustrating one embodiment of system data.

FIG. 2C is a schematic block diagram illustrating one embodiment of system data 290. The system data 290 may be organized as a data structure in a memory. In the depicted embodiment, the system data 290 includes the decryption key 291 and the private data 293. In addition, the system data 290 may include a claw back command 295. The private data 293 is encrypted with an encryption key. The decryption key 291 decrypts the encrypted private data 293.

In one embodiment, access to the decryption key 291 is restricted by encrypting the decryption key 291 with an access encryption key. In addition, access to the decryption key 291 may be restricted by restricting access to the decryption key 291 in the memory of the electronic device 110.

The claw back command 295 may include a security credential that authorizes the deletion of the private data 293 on the electronic device 110. The security credential may be encrypted.

Figure 3A:
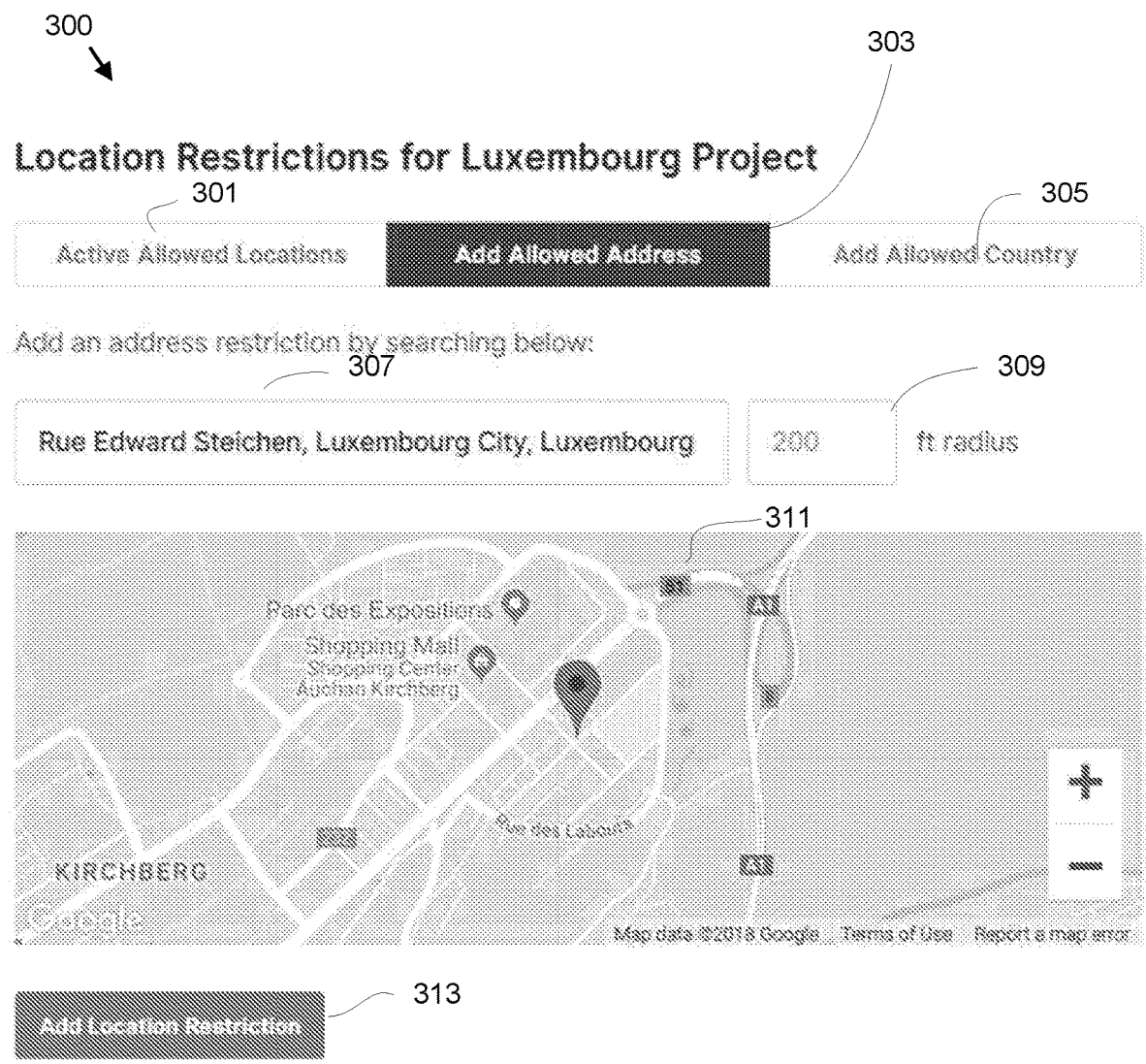
FIG. 3A is a drawing illustrating one embodiment of a location restriction screen.

FIG. 3A is a drawing illustrating one embodiment of a location restriction screen 300. The location restriction screen 300 may be presented on the display 120. In the depicted embodiment, the location restriction screen 300 includes an active allowed locations button 301, an add allowed address button 303, an add allowed country button 305, an address field 307, a radius field 309, a map 311, and an add location restriction button 313.

The selected add allowed address button 303 displays the address field 307, radius field 309, map 311, and add location restriction button 313. The address field 307 may specify the center point of the geographic area 251. The map 311 may also specify the center point of the geographic area 251. In addition, the map 311 may show the extent of the geographic area 251. The radius field 309 may specify the radius of the geographic area 251. The add location restriction button 313 may add the address field 307 and the radius field 309 to the geographic area 251.

Figure 3B:
FIG. 3B is a drawing illustrating one alternate embodiment of a location restriction screen.

FIG. 3B is a drawing illustrating one alternate embodiment of the location restriction screen 300. In the depicted embodiment, the add allowed country button 305 is selected and a country field 315 is displayed. The country field 315 may be filled with the country selected from a country list 317. The geographic area 251 may be satisfied if the device location 203 is within the one or more selected countries.

Figure 3C:
FIG. 3C is a drawing illustrating one alternate embodiment of a location restriction screen.

FIG. 3C is a drawing illustrating one alternate embodiment of the location restriction screen 301. In the depicted embodiment, the active allowed locations button 301 is selected. In response, a location list 319 of active geographic areas 251 is presented on the display 120. The geographic area 251 may be satisfied for each of the active geographic areas 251.

FIG. 3D is a drawing illustrating one embodiment of a time restriction screen 301. The time restriction screen 301 may be presented on the display 120. In the depicted embodiment, the time restriction screen 301 includes an active allowed times button 323, an add allowed time button 325, and an allowed time zone button 327. Selecting the active allowed times button 323 displays a time listing of allowed times in the time range 253. Selecting the add allowed time button 325 allows the user to add allowed times to the time range 253. In the depicted embodiment, the allowed time zone button 327 is selected allowing the user to select one or more time zones for the time range 253.

Figure 4:
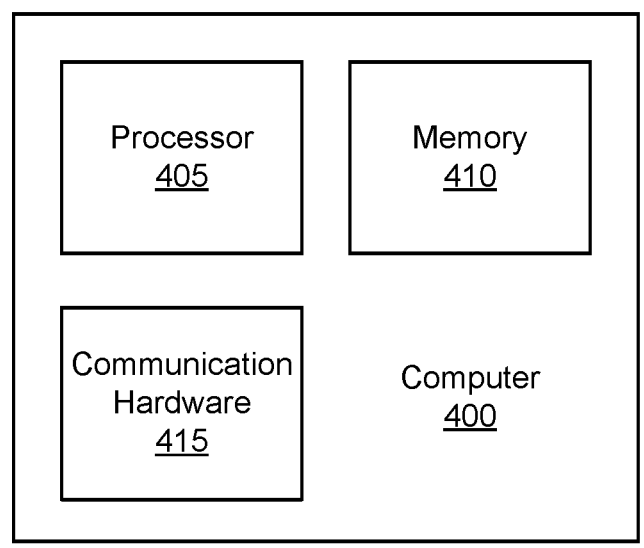
FIG. 4 is a schematic block diagram illustrating one embodiment of a computer.

FIG. 4 is a schematic block diagram illustrating one embodiment of a computer 400. The computer 400 may be embodied in the electronic device 110 and/or the management device 105. In the depicted embodiment, the computer 400 includes a processor 405, a memory 410, and communication hardware 415. The memory 410 may include a semiconductor storage device, hard disk drive, an optical storage device, a micromechanical storage device, or combinations thereof. The memory 410 may store code. The processor 405 may execute the code. The communication hardware 415 may communicate with other devices such as the network 115.

Figure 5A:
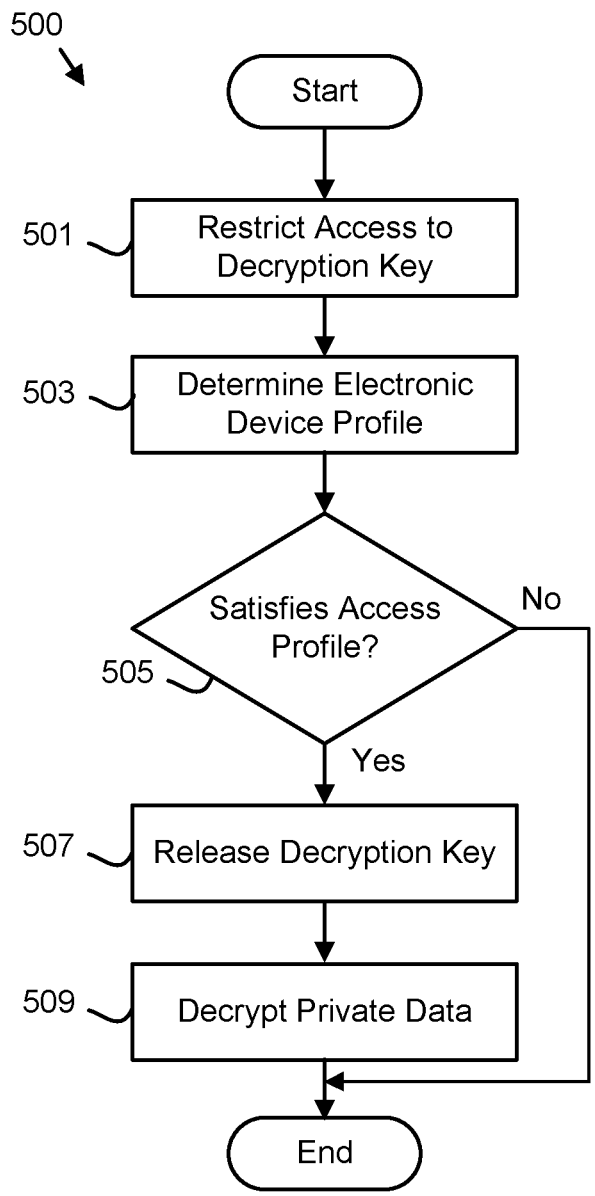
FIG. 5A is a schematic flow chart diagram illustrating one embodiment of a private data decryption method.

FIG. 5A is a schematic flow chart diagram illustrating one embodiment of a private data decryption method 500. The method 500 may only decrypt the private data 293 in response to the access policy 250 being satisfied. The method 500 may be performed by the processors 405 of the electronic device 110 and/or the management device 105.

The method 500 starts, and in one embodiment, the processor 405 may restrict 501 access to the decryption key 291 for the private data 293 on the electronic device 110. The private data 293 is encrypted and comprises group communications for a user group. In one embodiment, the processor 405 may encrypt the decryption key 291 with the access encryption key. In addition, the processor 405 may restrict access to the decryption key 291 in the memory 410. The decryption key 291 may be programmatically unavailable.

In one embodiment, access to the decryption key 291 is restricted 501 by the management device 105. The management device 105 may be remote from the electronic device 110. The management device 105 may communicate a restriction code to the electronic device 110 that restricts 501 access to the decryption key 291.

In addition, access to the decryption key 291 may be automatically restricted 501 if the access policy 250 is not satisfied. In one embodiment, access to the decryption key 291 is automatically restricted 501 after a specified restriction time interval such as 24 hours.

The processor 405 may determine 503 the electronic device profile 200. In one embodiment, the electronic device profile 200 includes the device time 201 and the device location 203. In addition, the electronic device profile 200 may comprise the device orientation 205, the device proximity 207, the device motion 209, the device acceleration 211, and/or the device profile history 213.

The processor 405 may release 505 the decryption key 291 in response to the electronic device profile 200 satisfying the access policy 250. In one embodiment, the access policy 250 is satisfied if the device location 203 is within the specified geographic area 251. In addition, the access policy 250 may be satisfied if the device time 201 is within the specified time range 253. In a certain embodiment, the access policy 250 is satisfied if both the device location 203 is within the specified geographic area 251 and the device time 201 is within the specified time range 253.

The access policy 250 may be satisfied if a weighted difference between the electronic device profile 200 and the device profile history 213 is within the threshold difference 255. The weighted difference WD may be calculated using Equation 1, wherein ΔT is a difference between the device time 201 and the mean of the historical device times 201 from the device profile history 213, ΔL is a difference between the device location 203 and a mean of the historical device locations 203 from the device profile history 213, ΔO is a difference between the device orientation 205 and a mean of the device orientations 205 from the device profile history 213, ΔP is a difference between the device proximity 207 and a mean of the historical device proximities 207 from the device profile history 213, ΔM is a difference between the device motion 209 and a mean of the historical device motions 209 from the device profile history 213, and AA is a difference between the device acceleration 211 a mean of the historical device accelerations 211 from the device profile history 213, and K1-6 are nonzero constants $$WD=(K1*\Delta T)+(K2*\Delta L)+(K3*\Delta O)+(K4*\Delta P)+(K5*\Delta M)+(K6*\Delta A) \qquad \text{Equation 1}$$

In one embodiment, the access policy 250 is not satisfied if one or more of the device orientation 205 exceeds the orientation threshold 257, the device proximity 207 exceeds a proximity threshold 259, the device motion 209 exceeds the motion threshold 261, and the device acceleration 211 exceeds the acceleration threshold 263.

The released decryption key 291 may be decrypted. Alternatively, the released decryption key 291 may be made available in the memory 410.

In response to releasing 505 the decryption key 291, the processor decrypts 509 the private data 293 using the decryption key 291 and the method 500 ends. The method 500 prevents access to the private data 293 unless the access policy 250 is satisfied. As a result, the private data 293 is efficiently and reliably protected.

Figure 5B:
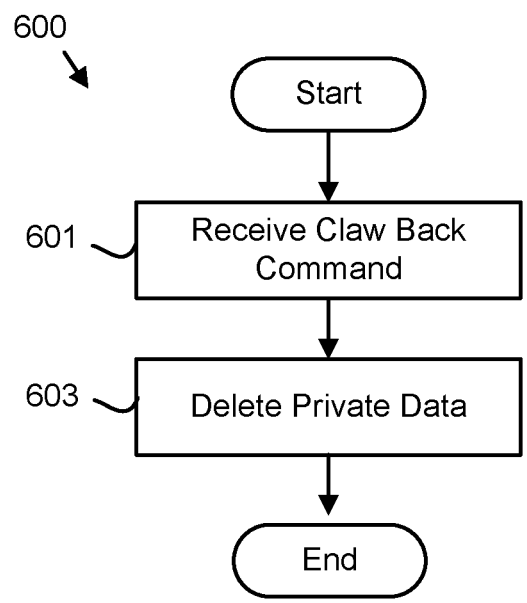
FIG. 5B is a schematic flow chart diagram illustrating one embodiment of a data claw back method.

FIG. 5B is a schematic flow chart diagram illustrating one embodiment of a data claw back method 600. The method 600 may claw back private data 293 that was entrusted to the electronic device 110. The method 600 may be performed by the processor 405 of the electronic device 110 and/or the management device 105.

The method 600 starts, and in one embodiment, the processor 405 receives 601 the claw back command 295 from the management device 105. The processor 405 may further decrypt the security credential from the claw back command 295 and the encrypted security credential stored by the electronic device 110. If the decrypted security credentials match, the processor 405 may receive 601 the claw back command 295. The processor 405 may automatically receive 601 the claw back command 295.

In response to receiving 501 the claw back command 295 the processor 405 may delete 603 the private data 293 from the electronic device 110 and the method 600 ends. As a result, the private data 293 may be removed from the electronic device 110.

The embodiments improve the protection of the private data 293 on the electronic device 110. In addition to the usual access protections for the electronic device 110, the private data 293 may only be accessed if the access policy 250 is satisfied. Thus if the device time 201 does not satisfy the time range 253 and/or the device location 203 does not satisfy the geographic area 251, the private data 293 cannot be accessed even by a user with full access to the electronic device 110. As a result, the function of the electronic device 110 in protecting the private data 293 is enhanced. In addition, the efficiency of protecting the private data 293 by the electronic device 110 is improved as the protection is automatic.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   restricting, by use of a processor, access to a decryption key for private data on an electronic device, wherein the private data is encrypted and comprises group communications;
   determining an electronic device profile comprising a device time, a device location of the electronic device, a device orientation of the electronic device, a device proximity of the electronic device to a user, a device motion of the electronic device, and a device acceleration of the electronic device;
   releasing the decryption key in response to the electronic device profile satisfying an access policy, wherein the access policy is satisfied if a weighted difference between the electronic device profile and a device profile history is within a difference threshold and the weighted difference WD is calculated as WD= (K1*ΔT)+(K2*ΔL)+(K3*ΔO)+(K4*ΔP)+(K5*ΔM)+ (K6*ΔA), ΔT is a difference between the device time and the mean of historical device times from a device profile history, ΔL is a difference between the device location and a mean of historical device locations from the device profile history, ΔO is a difference between the device orientation and a mean of historical device orientations from the device profile history, ΔP is a difference between the device proximity and a mean of historical device proximities from the device profile history, ΔM is a difference between the device motion and a mean of historical device motions from the device profile history, and ΔA is a difference between the device acceleration a mean of historical device accelerations from the device profile history, and K1-6 are nonzero constants; and
   decrypting the private data using the decryption key.

2. The method of claim 1, wherein the access policy is further satisfied if the device location is within a specified geographic area.

3. The method of claim 1, wherein the access policy is further satisfied if the device time is within a specified time range.

4. The method of claim 1, wherein the access policy is further satisfied if the device location is within a specified geographic area and the device time is within a specified time range.

5. The method of claim 1, wherein access to the decryption key is restricted by a remote management device.

6. The method of claim 1, the method further comprising deleting the private data on the electronic device in response to a claw back command from a remote management device.

7. The method of claim 1, wherein restricting the decryption key is selected from the group consisting of encrypting the decryption key and restricting access to the decryption key in a memory.

8. An apparatus comprising:
  a processor;
  a memory storing code executable by the processor to perform:
    restricting access to a decryption key for private data on an electronic device, wherein the private data is encrypted and comprises group communications;
    determining an electronic device profile comprising a device time, a device location of the electronic device, a device orientation of the electronic device, a device proximity of the electronic device to a user, a device motion of the electronic device, and a device acceleration of the electronic device;
    releasing the decryption key in response to the electronic device profile satisfying an access policy, wherein the access policy is satisfied if a weighted difference between the electronic device profile and a device profile history is within a difference threshold and the weighted difference WD is calculated as WD= (K1*$\Delta$T)+(K2*$\Delta$L)+(K3*$\Delta$O)+(K4*$\Delta$P)+(K5*$\Delta$M)+ (K6*$\Delta$A), $\Delta$T is a difference between the device time and the mean of historical device times from a device profile history, $\Delta$L is a difference between the device location and a mean of historical device locations from the device profile history, $\Delta$O is a difference between the device orientation and a mean of historical device orientations from the device profile history, $\Delta$P is a difference between the device proximity and a mean of historical device proximities from the device profile history, $\Delta$M is a difference between the device motion and a mean of historical device motions from the device profile history, and $\Delta$A is a difference between the device acceleration a mean of historical device accelerations from the device profile history, and K1-6 are nonzero constants; and
    decrypting the private data using the decryption key.

9. The apparatus of claim 8, wherein the access policy is further satisfied if the device location is within a specified geographic area.

10. The apparatus of claim 8, wherein the access policy is further satisfied if the device time is within a specified time range.

11. The apparatus of claim 8, wherein the access policy is further satisfied if the device location is within a specified geographic area and the device time is within a specified time range.

12. The apparatus of claim 8, wherein access to the decryption key is restricted by a remote management device.

13. The apparatus of claim 8, the processor further deleting the private data on the electronic device in response to a claw back command from a remote management device.

14. A program product comprising a non-transitory computer readable storage medium storing code executable by a processor to perform:
  restricting access to a decryption key for private data on an electronic device, wherein the private data is encrypted and comprises group communications;
  determining an electronic device profile comprising a device time, a device location of the electronic device, a device orientation of the electronic device, a device proximity of the electronic device to a user, a device motion of the electronic device, and a device acceleration of the electronic device;
  releasing the decryption key in response to the electronic device profile satisfying an access policy, wherein the access policy is satisfied if a weighted difference between the electronic device profile and a device profile history is within a difference threshold and the weighted difference WD is calculated as WD= (K1*$\Delta$T)+(K2*$\Delta$L)+(K3*$\Delta$O)+(K4*$\Delta$P)+(K5*$\Delta$M)+ (K6*$\Delta$A), $\Delta$T is a difference between the device time and the mean of historical device times from a device profile history, $\Delta$L is a difference between the device location and a mean of historical device locations from the device profile history, $\Delta$O is a difference between the device orientation and a mean of historical device orientations from the device profile history, $\Delta$P is a difference between the device proximity and a mean of historical device proximities from the device profile history, $\Delta$M is a difference between the device motion and a mean of historical device motions from the device profile history, and $\Delta$A is a difference between the device acceleration a mean of historical device accelerations from the device profile history, and K1-6 are nonzero constants; and
  decrypting the private data using the decryption key.

* * * * *